United States Patent [19]
Timmons

[11] Patent Number: 5,437,309
[45] Date of Patent: Aug. 1, 1995

[54] LOCKABLE WELL CAP

[76] Inventor: Robert D. Timmons, R.F.D. Meadowdale Rd., Prairie Du Sac, Wis. 53578

[21] Appl. No.: 213,204

[22] Filed: Mar. 15, 1994

[51] Int. Cl.⁶ .............................................. F16L 55/10
[52] U.S. Cl. .................................... 138/89; 138/96 R; 166/192
[58] Field of Search ................... 138/89, 96 R, 96 T; 220/235; 166/92, 75.1, 192, 202; 165/71

[56] References Cited

U.S. PATENT DOCUMENTS

| | | | |
|---|---|---|---|
| 1,193,769 | 8/1916 | Cushing | 138/89 |
| 1,835,418 | 12/1931 | McHardy | 138/89 |
| 2,218,581 | 10/1940 | Levan | 138/89 |
| 2,667,139 | 1/1954 | Campbell | 138/89 |
| 2,780,718 | 2/1957 | Mullen . | |
| 2,812,819 | 11/1957 | Albabes . | |
| 3,087,512 | 4/1963 | Hickman et al. . | |
| 3,156,373 | 11/1964 | Willis . | |
| 3,291,156 | 12/1966 | Corsano | 138/89 |
| 3,494,504 | 2/1970 | Jackson | 138/89 |
| 3,606,073 | 9/1971 | Burke . | |
| 3,613,936 | 10/1971 | Kaiser | 138/89 |
| 3,618,811 | 11/1971 | Mortine . | |
| 3,672,403 | 6/1972 | Wilson | 138/89 |
| 3,722,549 | 3/1973 | Wilson et al. | 138/89 |
| 3,747,541 | 7/1973 | Reese . | |
| 3,901,167 | 8/1975 | Reese | 220/235 |
| 4,303,101 | 12/1981 | Tholen . | |
| 4,337,799 | 7/1982 | Hoover . | |
| 4,415,005 | 11/1983 | Janzen . | |
| 4,848,458 | 7/1989 | Holdsworth et al. . | |
| 4,881,597 | 11/1989 | Hensley . | |
| 5,181,543 | 1/1993 | Hendzec | 138/89 |
| 5,184,608 | 2/1993 | Hale, III . | |
| 5,211,206 | 5/1993 | LaBonte et al. . | |

Primary Examiner—James E. Bryant, III
Attorney, Agent, or Firm—Shlesinger, Arkwright, & Garvey

[57] ABSTRACT

A locking cap for securing the open end of a well pipe to prevent contaminants from entering the well comprising a cap member adapted to be disposed over the open end of a well pipe casing to be locked, an outer flange downwardly extending from the cap member and integral therewith, the outer flange adapted to fit over the exterior surface of the well pipe casing to be locked, inner flange downwardly extending from the cap member and integral therewith, the inner flange adapted to fit about the interior surface of the well pipe casing to be locked, the inner flange including a series of parallel slots extending longitudinally inward from the end of the inner flange and towards the cap member to provide a series of radially expandable gripping fingers positioned along the perimeter of the well pipe casing interior surface, a cam disk positioned coaxially adjacent the inner flange, the cam disk being selectively movable against the fingers to radially expand each of the fingers into binding engagement against the interior surface of the well pipe thereby securing the cap member in place and an activating device for the cam disk to selectively urge the disk into and out of engagement with each of the fingers to radially expand the same.

12 Claims, 2 Drawing Sheets

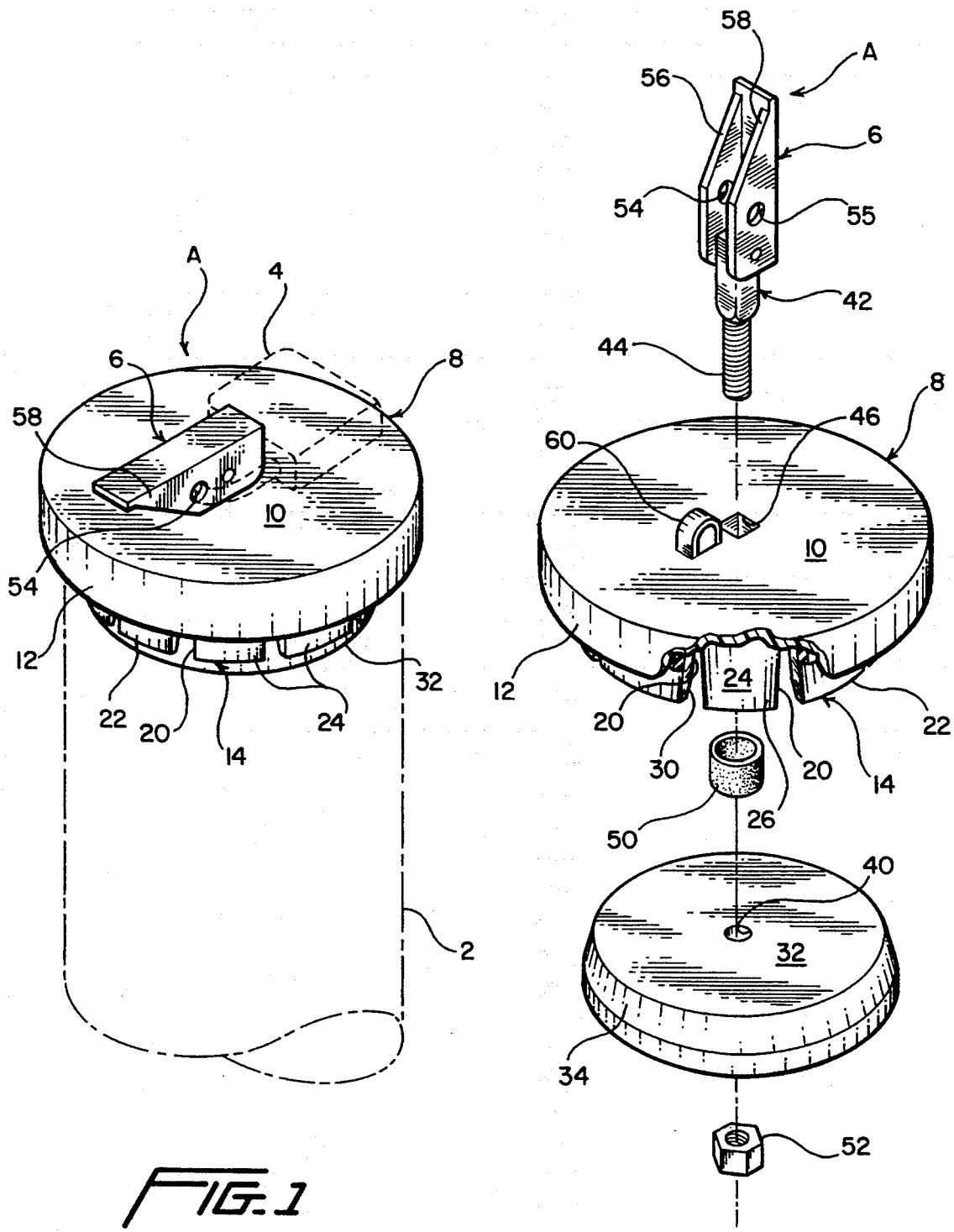

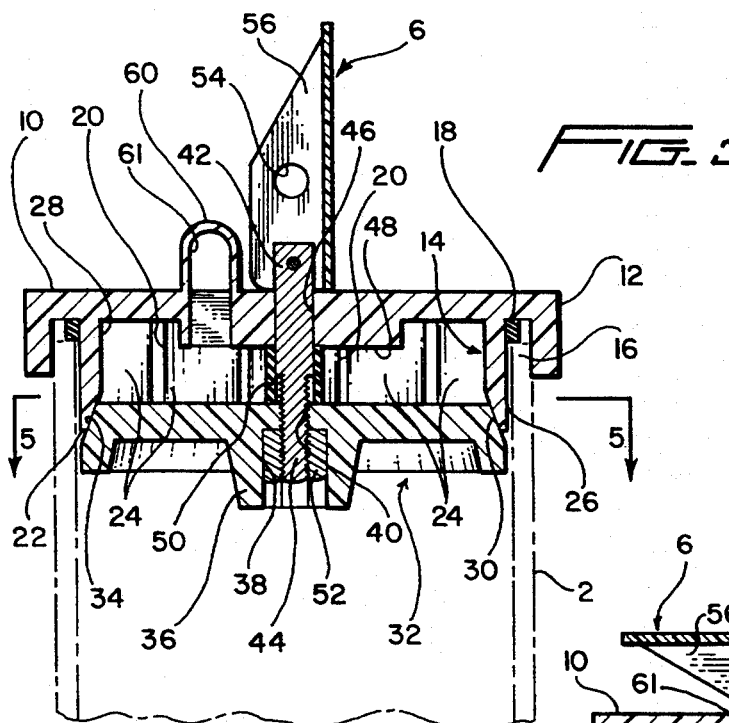
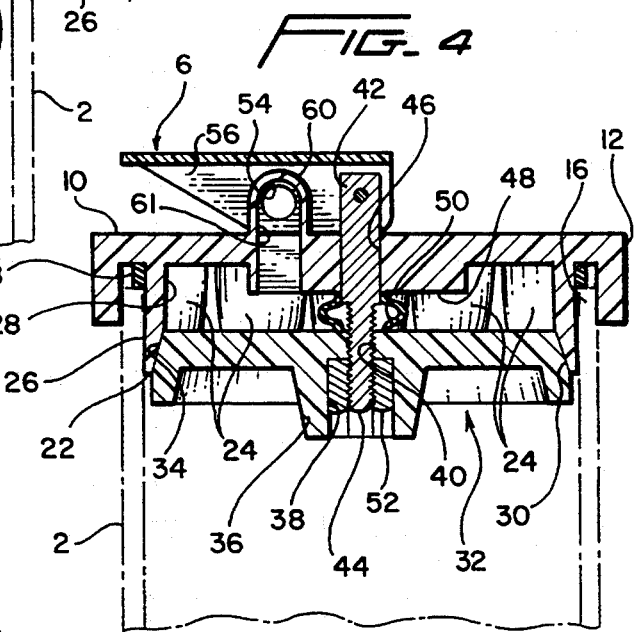
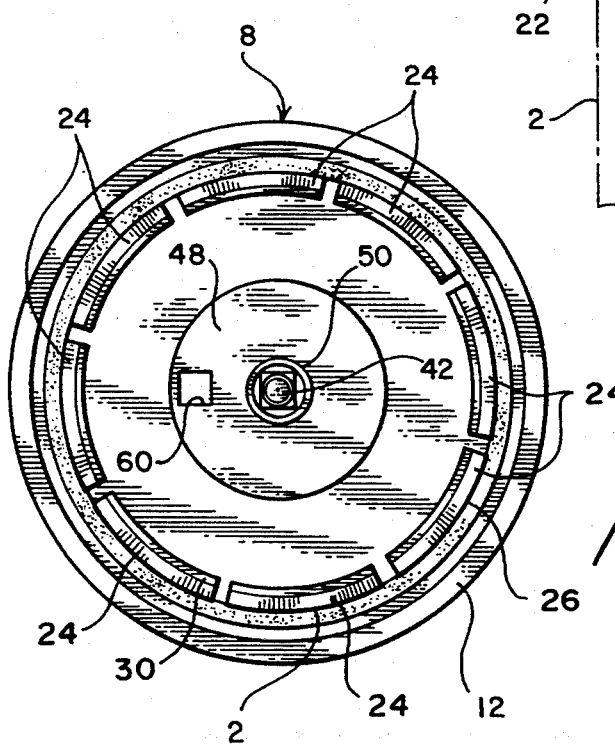

LOCKABLE WELL CAP

FIELD OF THE INVENTION

The present invention relates to well top enclosures and more particularly to a cap for an environmental monitoring well which will restrict access to the well.

BACKGROUND OF THE INVENTION

It has become increasingly common in recent years to place monitoring wells in areas where pollution is suspected of affecting the water supply. Such wells typically extend into the underground aquifer thereby allowing the water to be sampled and tested for contamination.

Since a well of this type is sampled periodically, it is often necessary to leave the well in an undisturbed state when no sampling is being conducted. During such periods, the instrumentation and sampling equipment are removed from the well top leaving it vulnerable to tampering or trespass. Preventing access to the well is particularly critical with monitoring wells since the purpose of such wells is to test and sample the underground aquifer in an undisturbed condition. It is therefore desirable to secure the top of the well and prevent unauthorized access to the well.

Numerous prior art well caps exist in an attempt to secure access to the top of the well pipe. For example, U.S. Pat. No. 4,881,597 to Hensley and U.S. Pat. No. 5,184,608 to Hale, III disclose locking caps which are hinged and include provisions for securing a padlock or other device to the cap. Although these devices succeed in securing the top of the well pipe they are not entirely satisfactory. These devices are attached to the well pipe using grout, glue or other cement which could contaminate the well water and compromise the integrity of the monitoring process. Further, these devices include hinges which are exposed and therefore subject to weathering and eventual failure.

Other types of devices include plugs which incorporate cams that expand a liner against the inner wall of the pipe to secure the plug within the pipe. For example, U.S. Pat. No. 3,618,811 to Martine and U.S. Pat. No. 4,303,101 to Tholen provide wedge devices which are inserted into the end of the conduit and are tightened to cap or plug-off the end of the pipe. These devices are often found in sewer pipes or other conduits and have been found to be unsatisfactory when used in the capping of monitoring wells. The plugs are constructed from varied elastomeric materials which can leach contaminants into the well. Further, the devices do not provide a tamper-proof means for securing or locking the end of the pipe. There are no provisions for attaching a padlock and plug-type devices may be pried off using a screwdriver, chisel or other means. Lastly, these devices do not transmit sufficient locking force to the interior walls of the pipe and tend to loosen up over time due to their flexibility.

A need has therefore existed in the art for a locking cap that secures the open end of a well pipe, prevents contamination of the well, is of simple construction, provides a secure means of attachment and may receive a padlock or other supplementary locking device.

OBJECTS AND SUMMARY OF THE INVENTION

The present invention is directed to a locking cap for securing the open end of a well pipe to prevent contaminants from entering the well comprising a cap member adapted to be disposed over the open end of a well pipe casing to be locked, an outer flange means downwardly extending from the cap member and integral therewith, the outer flange adapted to fit over the exterior surface of the well pipe casing to be locked, inner flange means downwardly extending from the cap member and integral therewith, the inner flange adapted to fit about the interior surface of the well pipe casing to be locked, the inner flange including a series of parallel slots extending longitudinally inward from the end of the inner flange and towards the cap member to provide a series of radially expandable gripping fingers positioned along the perimeter of the well pipe casing interior surface, a cam disk positioned coaxially adjacent the inner flange means, the cam disk being selectively movable against the fingers to radially expand each of the fingers into binding engagement against the interior surface of the well pipe thereby securing the cap member in place and actuation means for the cam disk to selectively urge the disk into and out of engagement with each of the fingers to radially expand the same.

It is an object of the present invention to provide a locking cap for securing the open end of a well pipe that is entirely constructed from chemically inert materials thereby reducing the possibility of contamination of the well water.

It is a further object of the present invention to provide a locking cap for securing the open end of a well pipe which firmly secures the cap to the end of the pipe by means of a lever and cam arrangement that cannot be readily pried off or tampered with.

A still further object of the present invention is to provide a locking cap for securing the open end of a well pipe that is constructed from lightweight PVC material and is resistant to rust and weathering.

A still further object of the present invention is to provide a locking cap for securing the open end of a well pipe which is simple in operation and design, has few parts and is therefore less likely to fail during use.

Yet another object of the invention is to provide a locking cap for securing the open end of a well pipe which is economical to manufacture.

Still a further object of the present invention is to provide a locking cap for securing the open end of a well pipe which functions as a general seal for the monitoring well pipe.

Still a further object of the present invention is to provide a locking cap for securing the open end of a well pipe that requires less force for actuating the locking lever while still providing increased side pressure for locking against the interior of the pipe.

Still a further object of the present invention is to provide a locking cap for securing the open end of a well pipe that is easily removable and requires no grout, glue or other means to secure it to the end of a well pipe.

Still a further object of the present invention is to provide a locking cap for preventing entry of small animals, leaves or other vegetation into the pipe.

Yet another object of the present invention is to provide a locking cap for securing the open end of a well pipe which cap fits over the entire end of the well pipe.

Yet a further object of the present invention is to provide a locking cap for securing the open end of a well pipe which is rugged and durable yet relatively simple in its construction and which is characterized in having a long and trouble-free operational life.

Still a further object of the present invention is to provide a locking cap for securing the open end of a well pipe which can be applied to or removed from the end of the well pipe without the need for tools such as screwdrivers or the like.

Still a further object of the present invention is to provide a locking cap for the end of a well which is reinforced at critical regions near the lever and cam disk to reinforce and buttress the cap thereby reducing the likelihood of failure.

Additional objects and advantages of the invention will become apparent from the following detailed description of the preferred embodiments of the invention to be read in conjunction with the accompanying drawings which illustrate such preferred embodiments.

DESCRIPTION OF THE DRAWINGS

FIG. 1 is a perspective view of the locking cap according to the present invention when secured to the end of a well pipe and showing the well pipe and padlock in phantom lines.

FIG. 2 is an exploded perspective view of the locking cap according to the present invention with portions of the cap member broken away to expose of the individual gripping fingers.

FIG. 3 is a cross-sectional view of the locking cap according to the present invention in the unlocked portion and fitted onto the end of a well pipe shown in phantom lines.

FIG. 4 is a cross-sectional view of the locking cap according to the present invention in a locked position and fitted onto the end of a well pipe shown in phantom lines.

FIG. 5 is a bottom plan view of the locking cap according to the present invention with the cam disk removed.

DETAILED DESCRIPTION OF THE PREFERRED EMBODIMENTS

Referring initially to FIG. 1 of the drawings, the locking cap A is shown in an operative position of engagement with the end of a well pipe 2 and further including a supplemental locking means or padlock 4 affixed to lever 6. Turning now to FIG. 2, the various individual components of locking cap A are shown in greater detail. The locking cap A includes a cap 8 generally comprising a circular top portion 10. The cap member A includes a downwardly extending rim or outer flange 12 integral with the cap member A. A second flange or skirt 14 downwardly extends from the cap member A as best shown in FIG. 3. The inner flange or skirt 14 is spaced a selected distance from outer flange 12 so that the end 16 of the well pipe 2 is received within the space created therebetween. An elastomeric O-ring or seal 18 is also disposed between the outer flange 12 and the inner flange 14.

As best shown in FIGS. 2 and 3, the inner flange or skirt 14 is provided with a series of vertically disposed parallel slots 20 extending longitudinally inward from the end portion 22 of the inner flange 14 towards the cap member 8 to create a series of individual gripping fingers 24. Each of the gripping fingers 24 includes an exterior surface 26 and an interior surface 28, the lower end of which contains a beveled surface 30.

As best shown in FIG. 2, a cam disk 32 is provided and positioned coaxial to the inner flange or skirt 14.

The cam disk 32 also includes a beveled surface 34 which is selectively movable into sliding engagement with beveled surface 30 of gripping fingers 24 in a manner to be further explained below. As best shown in FIG. 3, the cam disk 32 includes a reinforced portion 36 containing a recess 38 to receive nut 52 and an aperture 40 to receive a bolt 42.

Returning now to FIG. 2, the lever 6 is hingedly secured to a first end of bolt 42 the opposite end of which includes threaded portion 44. As best shown in FIG. 3, the bolt 42 is received within central aperture 46 disposed within the cap member 8 to allow axial movement therethrough. The aperture 46 is surrounded by reinforced portion 48 on the underside of cap member 8. The threaded portion 44 of bolt 42 extends beyond the reinforced portion 48 and into the central aperture 40 of cam disk 32 and is secured thereto by a nut 52. A elastomeric sleeve 50 is disposed between cap member 8 and cam disk 32 to create a seal for the bolt 42.

Lever 6 includes a pair of downwardly extending parallel flanges 56 and 58 each of which is provided with a respective aperture 54 and 55. The top portion 10 of cap member 8 is provided with projection 60 extending upwardly from the top portion 10 and including an opening 61 extending therethrough so that when the lever 6 is in the locked position shown in FIG. 4 the apertures 54 and 55 are aligned with opening 61. This arrangement allows a padlock 4 or other supplemental locking device to be affixed to the locking cap A as best shown in FIG. 1.

Turning now to FIG. 5, the reinforced portion 48 of cap member 8 provides reinforcement for both the lever 6 and the projection 60. This arrangement provides additional strength to those portions of the cap which are subjected to greater amounts of stress. In a similar manner, reinforced portion 36 of cam disk 32 provides support in the cam disk region where bolt 42 is secured.

In the preferred embodiment, cap member 8, lever 6 and cam disk 32 are fabricated from PVC or other plastic material. PVC is the preferable material since it provides the requisite thickness and is chemically inert thereby lessening the likelihood of the cap materials contributing to contamination of the monitoring well. Other high density plastics having similar stiffness and physical characteristics are contemplated within the scope of the present invention. Bolt 42 may be fabricated from brass or other high quality metal. The O-ring or seal 18 may be constructed from any elastomeric material and is intended to provide a general seal of the gap extending between the end of the well pipe 60 and cap member 8.

In operation, the lever 6 is extended to the open position as shown in FIG. 3 whereby bolt 42 is fully extended through cap member 8. Cam disk 32 is secured to the threaded portion 44 of bolt 42 and with the bolt 42 fully extended, is only minimally engaged at beveled surface 34 with beveled surfaces 30 of gripping fingers 24. Since there is no force being applied against it, the exterior surface 26 of gripping fingers 24 is spaced from the interior surface 62 of the well pipe 2. By tightening or loosening nut 52, the disk can be adjusted to increase or decrease the locking force against the interior of the pipe. As the lever 6 is urged from the vertical position shown in FIG. 3 to the horizontal position shown in FIG. 4, bolt 42 is caused to move axially upward through aperture 46 of cap member A and into the retracted position. Consequently, the cam disk 32 is pulled upwardly and urged into contact with the gripping fingers 24 at beveled surfaces 30 such that each of the gripping fingers 24 are urged outwardly and exterior finger surfaces 26 contact and tightly lock against the interior surface 62 of the well pipe 2.

Since the inner flange or skirt 14 includes a number of slots 20, the force required to move the lever 6 from the vertical position to the horizontal position is reduced while still providing a greater degree of force for locking gripping fingers 24 against the interior surface 62 of the well pipe 2. This is particularly advantageous since the locking cap is fabricated from a stiff, high density PVC and any other skirt design would be inoperable or result in a cap lever requiring too much force to actuate. In addition, the individual gripping finger arrangement of inner flange 14 allows the flange 14 to be adaptable to a well pipe having an uneven diameter while still being able to resist jamming once the cap member is locked into place. Further, the locking force against the pipe is more evenly distributed to the individual gripping fingers 24. This minimizes distortion and misalignment which would otherwise occur if the inner flange 14 was of a one-piece design. To release the locking cap from the end 16 of the well pipe 2, the lever 6 is simply pulled back into the vertical position thereby disengaging the cam disk 32 from applying force to the interior surface 28 of the gripping fingers 24 and allowing the cap member A to be easily slipped off of the end of the well pipe 2.

While this invention has been described as having a preferred design, it is understood that it is capable of further modifications, uses and/or adaptations of the invention following in general the principle of the invention and including such departments from the present disclosure as come within the known or customary practice in the art to which to invention pertains and as may be applied to the central features hereinbefore set forth, and fall within the scope of the invention and of the limits of the appended claims.

I claim:

1. A locking cap for securing the open end of a well to prevent contaminants from entering the well comprising:
    a) cap member adapted to be disposed over the open end of a well pipe casing to be locked;
    b) outer flange member downwardly extending from said cap member and integral therewith, said outer flange member having an interior wall, an exterior wall and a bottom edge, said outer flange member interior wall is substantially perpendicular to said cap member and adapted to engage against the exterior surface of the well pipe casing to be locked;
    c) inner flange member downwardly extending from said cap member and integral therewith, said inner flange member having an interior wall, an exterior wall of uniform diameter and a bottom edge, said inner flange member exterior wall is substantially perpendicular to said cap member and parallel to said outer flange inner surface, said inner flange member including a series of parallel slots extending longitudinally inward from said inner flange member bottom edge and towards said cap member to provide a series of radially expandable gripping fingers positioned along the perimeter of the well pipe casing interior surface;
    d) cam disk positioned coaxially adjacent said inner flange member bottom edge, said cam disk being selectively movable against said fingers to radially expand each of said fingers and cause the surface of said inner flange exterior wall to be substantially contacted along its length against the interior surface of the well pipe casing thereby securing said cap member in place; and
    e) means for actuating said cam disk to selectively urge said disk against said fingers.

2. A locking cap as set forth in claim 1 and wherein:
    a) said cam disk provided with a frustoconical head portion; and
    b) said inner flange member interior wall provided with a beveled surface adjacent said bottom edge for sliding contact against said frustoconical head portion when said disk is urged into and out of engagement with said individual fingers.

3. A locking cap as set forth in claim 1 and wherein:
    a) said actuation means comprising a shaft, the first end of which is centrally received in said disk and the second end of which extends centrally through said cap member for axial movement therethrough, said shaft second end provided with a lever arm to selectively move said shaft and cause said disk to be urged into and out of locking engagement with said fingers.

4. A locking cap as set forth in claim 3 and further comprising:
    a) means for locking said lever arm, said lever arm locking means including mating first and second locking portions, said first locking portion associated with said lever arm and said second locking portion associated with said cap member, said mating first and second locking portions adapted to receive a padlock or other supplemental locking device.

5. A locking cap as set forth in claim 3 and further comprising:
    a) gasket member disposed around said shaft between said cap member and said cam disk.

6. A locking cap as set forth in claim 1 and further comprising:
    a) O-ring disposed between said inner flange member and said outer flange member to provide a seal when said locking cap is secured to the end of a well pipe to be locked.

7. A locking cap as set forth in claim 1 and wherein:
    a) said parallel slots extend from said inner flange member bottom edge end to said cap member.

8. A locking cap as set forth in claim 4 and wherein:
    a) said cap member and said cam disk each provided with a centrally disposed buttress portion for structural reenforcement.

9. A locking cap as set forth in claim 3 and wherein:
    a) said shaft second end provided with an adjustment nut to secure said cam disk to said shaft, said nut selectively movable along the length of said shaft to vary the distance of said cam disk to said cap member thereby providing selective adjustment of engagement to the interior surface of the well pipe.

10. A locking cap as set forth in claim 8 and wherein:
    a) said cap member buttress portion is disposed immediately below said lever locking means.

11. A locking cap as set forth in claim 3 and wherein:
    a) each of said cap member, said outer flange member, said inner flange member, said cam disk and said lever arm are constructed from PVC.

12. A locking cap as set forth in claim 4 and wherein:
    a) said first locking portion comprising an opening extending through said lever arm and said second locking portion comprising a raised tab positioned on said cap member, said opening and said raised tab are disposed on said locking cap so that when said lever arm is positioned horizontal to said cap member, said opening and said raised tab align to receive a padlock or other locking means.

* * * * *